United States Patent [19]
Wirth, Jr. et al.

[11] Patent Number: 5,645,117
[45] Date of Patent: Jul. 8, 1997

[54] TOMPKINS TURNER

[75] Inventors: John Wirth, Jr.; Jay L. Sanger, both of Casper, Wyo.; Mark P. Tompkins, Albuquerque, N.Mex.

[73] Assignee: Woodworker's Supply, Wyo.

[21] Appl. No.: 655,772

[22] Filed: May 31, 1996

[51] Int. Cl.$^6$ .................................................. B27M 3/00
[52] U.S. Cl. .......................... 144/28; 144/4; 144/46; 144/135.2; 142/40; 142/54; 269/50; 269/52; 409/167
[58] Field of Search ........................ 409/165, 166, 409/167, 175, 182; 142/1, 31, 32, 37, 40, 54; 144/2.1, 3.1, 4, 12, 28, 46, 48, 135.2

[56] References Cited

U.S. PATENT DOCUMENTS

| | | | |
|---|---|---|---|
| 2,450,476 | 10/1948 | Harris | 144/28 |
| 2,769,466 | 11/1956 | Brauneis . | |
| 3,556,176 | 1/1971 | Harding . | |
| 3,712,093 | 1/1973 | Rackow . | |
| 4,230,655 | 10/1980 | Kruckel et al. | 144/28 |
| 4,553,575 | 11/1985 | Brown . | |
| 4,768,903 | 9/1988 | Merritt, Jr. . | |
| 5,127,452 | 7/1992 | Wilston . | |

OTHER PUBLICATIONS

Packard Woodworks, Woodturning Tools and Supplies, Winter 94/95, p. 25.
The Woodturners Catalog 1994/95, pp. 2-5 and 7.
The Woodturners Catalog 1990/91, pp. 26, 46 & 47.
Woodworker's Supply Catalog, Winter, Feb. 1996, p. 4.

*Primary Examiner*—W. Donald Bray
*Attorney, Agent, or Firm*—Cushman Darby & Cushman; Intellectual Property Group of Pillsbury; Madison & Sutro, LLP

[57] ABSTRACT

A turner holds a wood blank while positioning it adjacent a cutting bit of a router to cut the blank into a shaped cylindrical object. The turner includes a mandrel and two mandrel wheels attachable to ends of the mandrel, which each have finger gripping portions. A wood block is disposed on the mandrel and the wheels are attached to the mandrel. Spacers may be used to position the wood block. The mandrel/wood block assembly is then moved adjacent a cutting bit, such as a router bit, to remove wood from the wood block. This enables generally cylindrically shaped objects to be formed which may then be polished and finished and used in pens, mechanical pencils, handles and like holders.

20 Claims, 2 Drawing Sheets

TOMPKINS TURNER

This invention relates to a device which may be used to form shaped, generally cylindrical objects, and more particularly to a device which holds a router to cut the blank into a shaped cylindrical object, for use in the production of pens, mechanical pencils, handles and like holders.

BACKGROUND

Top of the line and custom pens and mechanical pencils have a wooden cylindrical body which surrounds an ink cartridge or lead compartment. These cylindrical bodies are traditionally produced using a lathe, whereby a wood blank is spun adjacent a cutting edge. By moving the cutting edge against the spinning blank, it is possible to produce a cylindrical wooden tube which may be polished and used as a pen/pencil body.

However, using a lathe to cut such pen/pencil bodies has distinct disadvantages. First, not every hobbyist has a access to a lathe in their personal workshop because lathes tend to be large, expensive pieces of equipment. Second, turning wood on a lathe is not an easy skill to master and a novice or hobbyist may experience a variety of problems.

For example, when the wood blank is spinning, the cutting edge can catch on the wood and cause a piece of the wood to chip off. Since the end result is a top of the line or custom pen, it is unacceptable to have any chips what-so-ever in the final product. Further, since exotic woods are often used to make the pen/pencil body, chipping of the wood is more problematic because the wood itself is often expensive. Also, it may be difficult for a novice or hobbyist to turn the wood so that the diameter of the cylinder to be formed is constant.

Although these problems may be overcome with practice and may not cause significant problems for a master woodworker, a novice or a person who enjoys working with wood in their home workshop may find that these difficulties often pose serious obstacles to producing professional-looking results.

SUMMARY OF THE INVENTION

It is an objective of this invention to provide a device which is easy to use and which allows the professional woodworker and hobbyist alike to reduce wood blanks to decorative cylindrical tubes, which then may be polished to form casings for pens, mechanical pencils and like fine crafts.

To achieve the foregoing and other objects of this invention, the invention relates to a turner for manually controlling the location of a piece of wood in a precise manner relative to a cutting edge. In a preferred embodiment, the turner of this invention generally has a mandrel detachably secured on its ends to mandrel wheels. The mandrel wheels have extending portions which are grippable by an users fingers to enable the user to hold the assembly.

In operation, a wood blank is bored, placed over the mandrel and held in place with spacers between the mandrel wheels. An operator holds the mandrel wheels by the finger gripping portions and positions the blank adjacent a router bit while moving the assembly longitudinally. By repeatedly moving the blank adjacent the router bit, while turning the blank slightly, the router removers all excess material from the wood blank. The end result is a generally cylindrical wooden tube which may then be polished and used as the casing for a pen, mechanical pencil, handle or like holder.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

This invention allows a user to securely hold a wood blank adjacent a router bit and move the wood blank so that the router bit will cut only a desired amount of the wood from the wood blank. In this manner, the wood blank will be reduced to a generally cylindrical wooden tube which may be polished and used as a body for a pen, mechanical pencil, handle or other similar holder. For convenience, this description will refer to a pen body, which is intended to be a generic term for a generally cylindrical wooden tube which may be used in a variety of applications.

Figure 1:
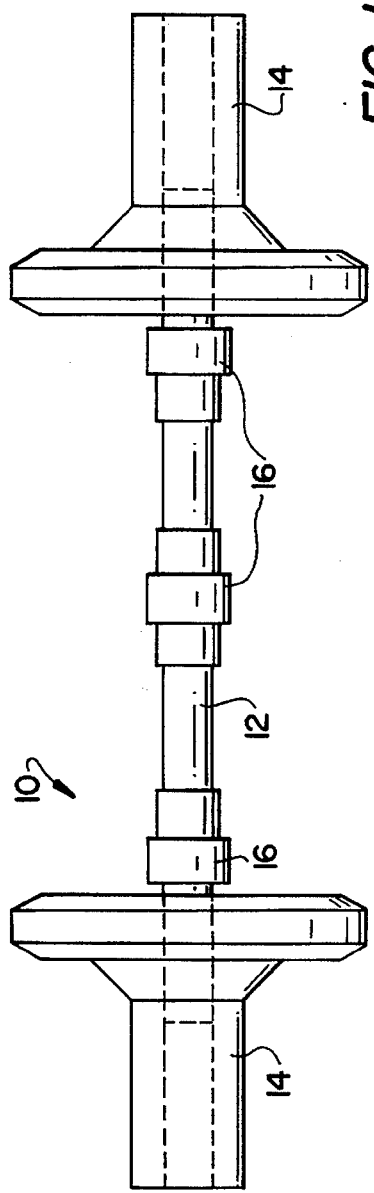
FIG. 1 is side view of a preferred embodiment of the turner of this invention.

According to one preferred embodiment, as shown in FIG. 1, a turner 10 has a mandrel 12 onto which mandrel wheels 14 are attached. The mandrel 12 is preferably threaded into mandrel wheels 14, but other means of attaching the mandrel wheels 14 to the mandrel 12 could be used instead, such as using a cotter pin, snap fitting, using a retaining screw, etc. Spacers or bushings 16 are disposed on mandrel 12 and are slidable relative to the mandrel wheels 14.

Figure 2:
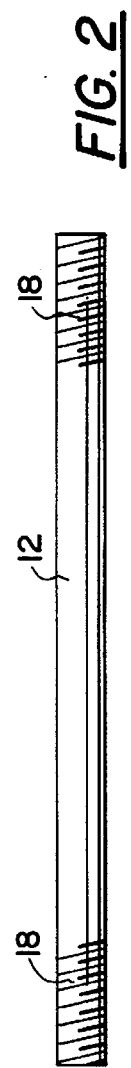
FIG. 2 is a side view of a mandrel for use in the embodiment shown in FIG. 1.

Mandrel 12 is preferably made of aluminum, stainless steel or another rigid metal. As shown more clearly in FIG. 2, mandrel 12 is preferably threaded on both ends 18 so that it may threadably engage the mandrel wheels 14.

Figure 4:
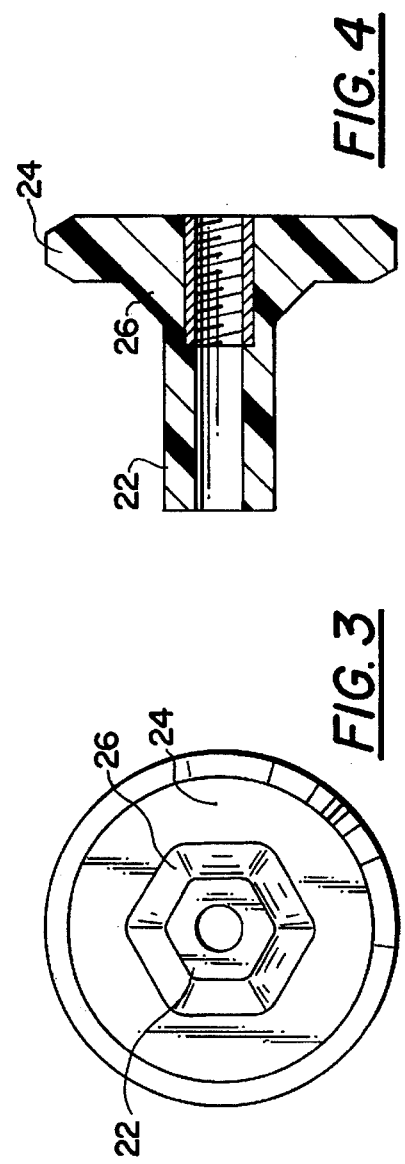
FIG. 4 is a partial cross-sectional view of the Mandrel wheel of FIG. 3.

Mandrel wheels 14 are preferably made of a suitable moldable material, such as high density plastic. However, the mandrel wheels 14 can be made of a metal, such as aluminum or stainless steel. As shown in FIG. 4, when mandrel wheels 14 are made of plastic, a stainless steel threaded insert 20 is preferably disposed within the mandrel wheel 14 to threadably receive the threaded end of the mandrel 12. This insert will serve to prolong the life of the mandrel wheels and to ensure that the mandrel wheels 14 will securely threadably receive the mandrel 12.

Figure 3:
FIG. 3 is an end view of the mandrel wheel shown in FIG. 1.

Mandrel wheels 14 have a finger gripping portion 22, a support portion 24 and a transition portion 26 between the finger gripping portion and the support portion 24. The finger gripping portion 22 may be hexagon-shaped, as shown in FIG. 3, may be round, or may be any other suitable shape. The main criteria for the finger gripping portion 22 is that it be of appropriate size and shape so that it may be securely grasped by an user of the turner.

The support portion 24 should be circular to enable wood disposed on the mandrel 12 to be formed with a round cross-section. However, it will be clear that varying the shape of the support portion will enable various cross-sections to be cut—i.e., if the support portion 24 is elliptical, the final cross-section of the wood piece will be elliptical, etc.

The transition section 26 mainly provides strength to the mandrel wheel 14 by strengthening the junction between the finger gripping portion 22 and the support portion 24. Preferably, the three sections 22, 24 and 26, of the mandrel wheel 14, are integrally formed during a single molding process and discontinuities do not exist between the three sections.

Figure 5:
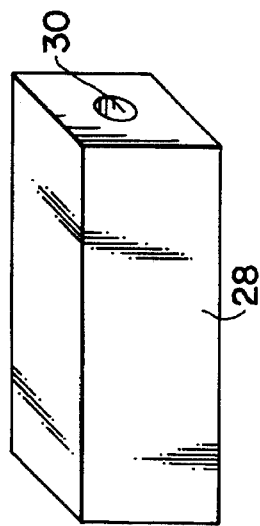
FIG. 5 is a perspective view of a typical wood block to be used with this invention.
Figure 6:
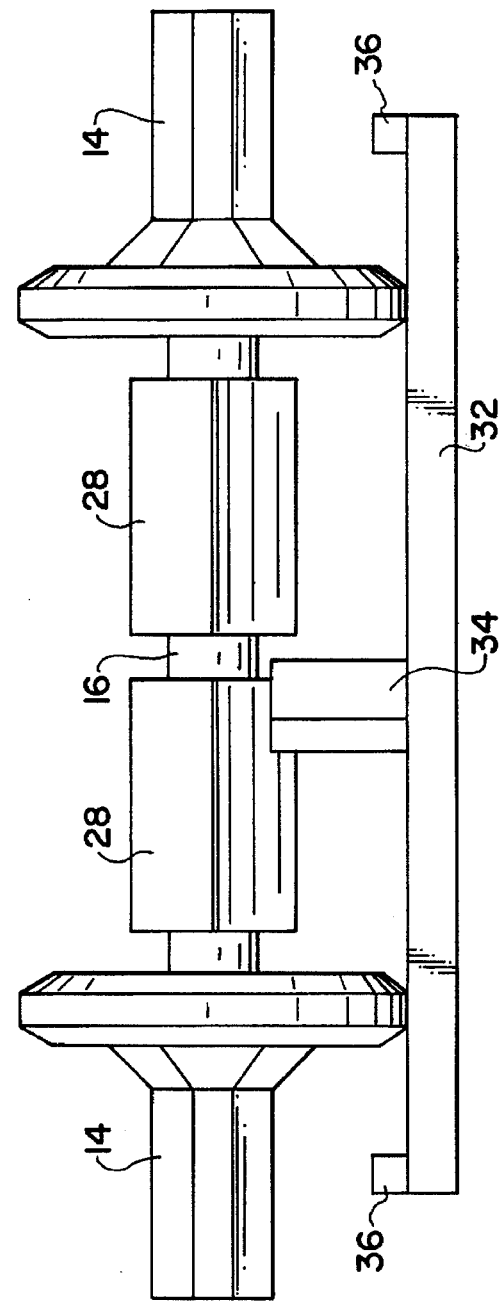
FIG. 6 is side view of the preferred embodiment of the turner of this invention shown in FIG. 1, in which two wood blocks as shown in FIG. 5 are disposed on the mandrel.

The spacers or bushings are provided to hold wood blanks 28 (see FIG. 6) on the turner 10. In operation, a wood blank 28 is drilled to form bore 30 (see FIG. 5). One or more wood blanks 28 are then are placed on mandrel 12 by inserting mandrel 12 into bores 30. FIG. 6 illustrates the situation where two wood blanks are placed on the mandrel 12. Spacers 16 are used to hold wood blank 28 in place—at least one spacer 16 is fit between the two wood blanks to separate them and at least one spacer 16 is fitted onto the end of each wood blank. Mandrel wheels 14 are then threaded onto mandrel 12.

The spacers should be generally cylindrical and have a central bore sized to fit over the mandrel 12. The spacers or bushing will generally have two outer diameters. The first outer diameter should be sized according to the inner diameter of the bore in the wood block so that the wood block can be securely positioned on the mandrel 12 regardless of the size of the diameter of the bore. By providing spacers with a variety of first diameters, the turner to be used with various pen kits regardless of how large or small the inner diameter must be formed to accommodate the components provided in the pen kit. The second diameter of the spacers should be larger than the bore in the wood block, to enable the spacers to be used to accurately space the wood from the mandrel wheels and from the other pieces of wood disposed on the mandrel.

In operation, (see FIG. 6) this assembled turner 10 with wood blanks 28 is moved on a router table 32 over a router bit 34 and the router bit 34 cuts away a portion of the wood blanks 28. Lateral movement of the assembled turner 10 is controlled by the stops 36 screwed into the router table 32. The assembled turner 10 is repeatedly moved laterally, causing the wood blanks 28 to move relative to the router bit 34. Each time the assembled turner 10 is moved laterally, the mandrel wheels 14 are turned slightly, so that a new portion of the wood blank is exposed to the router bit 34. In this manner, the router bit removes wood from the wood blank to reduce the cross-section of the wood blanks from a square to a circle. The diameter of the resulting cylindrical wooden tube may be controlled by adjusting the height of the router bit. As is apparent, the router may alternatively be placed horizontally or in another suitable position.

A more detailed description of a method of using the turner described above to produce pen bodies will now be given.

First, the wood blanks are cut to the desired length. When using commercially available pen kits the wood blanks should be cut to be ⅛ inch longer than the brass tubes provided with the pen kit. One example of a suitable pen kit of this nature is available from Woodworker's Supply of Casper, Wyo.

Next, the center of the blank ends is marked by drawing crossing lines from corner to corner of the square wood blank and the wood blank is drilled lengthwise with an appropriate diameter drill bit. To ensure accurate alignment of the drill bit with the center of the wood blank, the center of the blank can be indented using a punch or similar device prior to drilling.

A brass tube is then inserted into the drilled wood blank. The tube must fit tightly within the wood blank and may be pressed into place using a clamp or vice with wood jaws. It is necessary to press the tube into the wood blank slowly to prevent the wood blank from splitting. It may also be necessary to glue the tube in the wood blank. Any epoxy or gap filling cyanoacrylate (super glue) will work well.

The wood blanks with inserted brass tubes are placed onto the mandrel 12 using the spacers 16 provided at each end so that the wood blanks 28 are as close to the center of the mandrel 12 as possible.

The height of the router bit is set to be approximately ⅛ inch away from the spacers on the mandrel. This will make a rough-in cut. Preferably, the router bit used to make the rough in cut should be no smaller than ½ inch in diameter. Larger diameter router bits allow better control during operation and produce a higher quality finished product. Also, since the bottom of the cutter is the area that actually cuts the wood blank, a router bit with this capability must be used. One such suitable router bit is a plunge cutting carbide tipped bit, available from Woodworker's Supply of Casper, Wyo.

The wood fence should then be adjusted in or out until the center of the mandrel is centered over the top of the router bit.

Limit blocks 36 should be affixed to the table. Proper installation is achieved when the right mandrel wheel is in contact with the right limit block and the cutter is safely away from the left mandrel wheel. This is accomplished by sliding the mandrel to the right to the point the wood blanks clear the cutter but the left mandrel wheel is still safely away from the cutter and affixing one of the limit blocks to the table on the outside of the right mandrel wheel. (See FIG. 6) The left limit block can be positioned the same way. By placing limit blocks on the table in this fashion, running the router bit into the mandrel wheels can be avoided.

To shape the wood blank, the router is turned on and the mandrel is fed into the fence so that the wood blanks are located to the right side of the cutter. The mandrel is then fed to the left until a cut the full length of the wood blanks is achieved. Since this initial cut is the heaviest cut, it is important for the operator to make certain that a firm hold is applied to the finger gripping portions of the mandrel wheels. After the wood has been fed all the way through, the mandrel should be slid away from the fence, moved to the right, and rotated slightly. By repeating this process, numerous cuts can be performed until the blank has been cut all the way around. Since light cuts are easier to control than heavy cuts, it is preferable to only rotate the wood blank slightly each time the cutting process is performed. Additionally, the wood blanks should always be fed through the cutter from the left to the right.

After finishing the rough cut, the blanks are removed from the mandrel and sanded to the appropriate finished length (the length of the brass tube) and then replaced on the mandrel.

The height of the router bit tip is then adjusted upward in preparation for the finishing cut. The cutting process is then carried out as described above, until the blanks are of the appropriate diameter. The blanks are then sanded to the desired smoothness and finished in an appropriate manner. Sanding and finishing is easier if the blanks are left on the mandrel.

There are many ways to create decorative patterns in the wood blanks using variations of this procedure. For example, a v-groove bit or ogee bit may be used to pattern the wood. To restrict the location of the pattern, the limit blocks may be adjusted accordingly. Also, to cut a tapered end, a wedge shaped piece of material may be attached to the table for the mandrel wheels to ride up on.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims. Thus, it is to be understood that variations in the particular structure disclosed can be made without departing from the novel aspects of this invention as defined in the claims.

What is claimed is:

1. An apparatus for use with a cutting device and useful for shaping soft materials including wood, comprising:
    a mandrel having a first end and a second end, and a longitudinal axis extending between said first and said second ends;
    a first mandrel wheel detachably secured to said first end of said mandrel, said first mandrel wheel having a first finger gripping portion extending axially relative to said mandrel; and
    a second mandrel wheel detachably secured to said second end of said mandrel, said second mandrel wheel having a second finger gripping portion extending axially relative to said mandrel.

2. The apparatus of claim 1, further comprising at least one block of wood having a bore defined therethrough and disposed on said mandrel between said first mandrel wheel and said second mandrel wheel, said mandrel extending through said bore.

3. The apparatus of claim 1, wherein said first mandrel wheel has a first support portion with a diameter larger than a diameter of said first finger gripping portion and said second mandrel wheel has a second support portion with a diameter larger than a diameter of said second finger gripping portion.

4. The apparatus of claim 3, further comprising at least one block of wood having a bore defined therethrough and disposed on said mandrel between said first mandrel wheel and said second mandrel wheel, said mandrel extending through said bore.

5. The apparatus of claim 1, wherein said first mandrel wheel and said second mandrel wheel are each threadably attached to said first and second ends of said mandrel, respectively.

6. The apparatus of claim 5, wherein said first mandrel wheel and said second mandrel wheel are formed from a plastic material, and wherein a metal threaded insert is embedded in said plastic material to threadably said mandrel ends.

7. The apparatus of claim 1, further comprising at least one bushing disposed on said mandrel between said first mandrel wheel and said second mandrel wheel.

8. The apparatus of claim 7, further comprising at least one block of wood having a bore defined therethrough and disposed on said mandrel between said first mandrel wheel and said second mandrel wheel, said mandrel extending through said bore, and said at least one block of wood cooperating with said at least one bushing to be securely positioned on said mandrel.

9. The apparatus of claim 8, wherein the first end of said mandrel and the second end of said mandrel are threaded to form male threaded members, and an aperture in the first mandrel wheel and an aperture in the second mandrel wheel are threaded to form female threaded members.

10. The apparatus of claim 1, wherein said cutting device is a router bit rotatably coupled to a motor so that upon actuation of said motor, said router bit is caused to rotate.

11. A kit for use in connection with a cutting device to reduce a cross-sectional area of the a wood block, comprising:
    a mandrel;
    a first mandrel wheel adapted for selective attachment to a first end of said mandrel on one side, and having a first finger gripping portion disposed on another side;
    a second mandrel wheel adapted for selective attachment to a second end of said mandrel on one side, and having a second finger gripping portion disposed on another side; and
    bushings having bores sized so as to be slidably receivable on said mandrel to position the wood block.

12. The kit of claim 11, wherein said mandrel is threaded on each of the first end and the second end, and wherein said first mandrel wheel has a threaded aperture to receive the threaded first end of said mandrel, and said second mandrel wheel has a threaded aperture to receive the threaded second end of said mandrel.

13. The kit of claim 12, wherein said first mandrel wheel comprises a first threaded metal insert disposed to receive the threaded first end of said mandrel and said second mandrel wheel comprises a second threaded metal insert disposed to receive the threaded second end of said mandrel.

14. The kit of claim 11, further comprising at least one wood block which may be bored to be received on said mandrel.

15. The kit of claim 11, further comprising at least one wood block which is bored to be received on said mandrel.

16. A method of shaping a wood block, comprising the steps of:
    providing an apparatus, comprising;
        a mandrel having a first end and a second end, and a longitudinal axis extending between said first and said second ends;
        a first mandrel wheel detachably secured to said first end of said mandrel, said first mandrel wheel having a first finger gripping portion extending axially relative to said mandrel; and
        a second mandrel wheel detachably secured to said second end of said mandrel, said second mandrel wheel having a second finger gripping portion extending axially relative to said mandrel;
    disposing a bored wood block on said mandrel such that said mandrel extends through a bore in said bored wood block;
    detachably securing said first mandrel wheel to said first end of said mandrel and detachably securing said second mandrel wheel to said second end of said mandrel wheel to form a first assembly, said first assembly comprising said mandrel, said wood block and said first and second mandrel wheels;

placing said first assembly adjacent a cutting device so that a first aspect of said wood block is exposed to said cutting device;

moving said first assembly longitudinally so that said cutting device removes wood from said first aspect of said wood block;

removing said first assembly from said cutting device;

rotating said first assembly and placing said first assembly adjacent the cutting device so that a second aspect of said wood block is exposed to said cutting device; and moving said first assembly longitudinally so that said cutting device removes wood from said second aspect of said wood block.

17. The method of claim 16, wherein said cutting device is a router bit which protrudes from a router table on which the first assembly can rest during the step of moving said first assembly longitudinally.

18. The method of claim 17, further comprising attaching stops to said table to prevent said mandrel wheels from impinging on said router bit.

19. The method of claim 16, wherein said step of placing said first assembly adjacent a cutting device, said step of moving said first assembly longitudinally, and said step of removing said first assembly from said cutting device are repeated until said wood block is reduced to a cylindrical object.

20. The method of claim 17, wherein a wedge-shaped apparatus is attached to said router table in a location relative to said router bit such that when said first assembly is moved longitudinally, one of said first mandrel wheels and said second mandrel wheels will traverse said wedge-shaped apparatus thereby varying an amount of wood which is removed by said cutting device.

* * * * *